US009727509B2

United States Patent
Liu (10) Patent No.: US 9,727,509 B2
(45) Date of Patent: Aug. 8, 2017

(54) GPIB BUS TO ZIGBEE INTERCONNECTION (71) Applicant: SEMICONDUCTOR MANUFACTURING INTERNATIONAL (SHANGHAI) CORPORATION, Shanghai (CN)

(72) Inventor: Qi Liu, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 262 days.

(21) Appl. No.: 14/631,835

(22) Filed: Feb. 25, 2015

(65) Prior Publication Data
US 2015/0317267 A1    Nov. 5, 2015

(30) Foreign Application Priority Data
May 4, 2014 (CN) .......................... 2014 1 0184945

(51) Int. Cl.
*G06F 13/40* (2006.01)
*G06F 9/445* (2006.01)

(52) U.S. Cl.
CPC .......... *G06F 13/40* (2013.01); *G06F 9/44505* (2013.01); *G06F 13/4022* (2013.01)

(58) Field of Classification Search
CPC .......................... G06F 13/4018; G06F 13/4004
USPC ................................................... 710/305, 65
See application file for complete search history.

(56) References Cited

U.S. PATENT DOCUMENTS

| | | | | |
|---|---|---|---|---|
| 2,048,856 A | * | 7/1936 | Ferrier ..................... | A61C 7/10 433/148 |
| 7,644,628 B2 | * | 1/2010 | Harish ...................... | G01L 1/20 73/780 |
| 8,429,435 B1 | * | 4/2013 | Clayton .................. | H04L 12/10 700/19 |
| 2007/0115116 A1 | * | 5/2007 | Zabek ..................... | H04Q 9/00 340/539.22 |
| 2008/0183307 A1 | * | 7/2008 | Clayton ............... | G05B 19/042 700/8 |
| 2009/0225228 A1 | * | 9/2009 | Engel .................... | H04N 21/436 348/705 |
| 2010/0312930 A1 | * | 12/2010 | Yamagata ........... | G06F 13/4045 710/67 |
| 2011/0050164 A1 | * | 3/2011 | Partovi ................... | H01F 5/003 320/108 |
| 2012/0046859 A1 | * | 2/2012 | Imes .................. | G05D 23/1905 701/409 |
| 2016/0138931 A1 | * | 5/2016 | Kang ................... | G01C 21/362 701/533 |

* cited by examiner

*Primary Examiner* — Christopher Shin
(74) *Attorney, Agent, or Firm* — Kilpatrick Townsend & Stockton LLP (57) ABSTRACT

An interface conversion device and a wireless communication system including the interface conversion device are disclosed. The interface conversion device is connected to GPIB-equipped devices in a GPIB network to convert data in the GPIB format to the ZigBee format and vice versa, thereby transforming a cable network to a wireless network to increase the mobility, range, and number of devices in the network.

18 Claims, 5 Drawing Sheets

| [S3:S0] | Transmission frame types |
|---|---|
| 0000 | Downlink ZigBee system testing frame |
| 0001 | Uplink ZigBee response system testing frame |
| 0010 | Downlink GPIB controller message frame |
| 0011 | Uplink GPIB response of device status frame |
| 0100 | Downlink GPIB talker response message frame |
| 0101 | Uplink GPIB talker message frame |
| 1110 | Downlink reset all conversion devices frame |
| 1111 | Uplink response of conversion devices reset status frame |

GPIB BUS TO ZIGBEE INTERCONNECTION

CROSS-REFERENCES TO RELATED APPLICATIONS

This application claims priority to Chinese patent application No. 201410184945.3, filed on May 4, 2014, the content of which is incorporated herein by reference in its entirety.

BACKGROUND OF THE INVENTION

The present invention relates to the field of short-range communications, and more particularly to communications between instruments utilizing the GPIB (General Purpose Interface Bus) communication link.

At present, mainstream test equipment in a laboratory includes the General Purpose Instrument Bus (GPIB). Many automated test instruments are interconnected with each other using the GPIB communication link. Especially, some complex tasks of testing and measurement require several testing instruments comprising small testing equipment and large temperature control equipment and probe stations.

Figure 1:
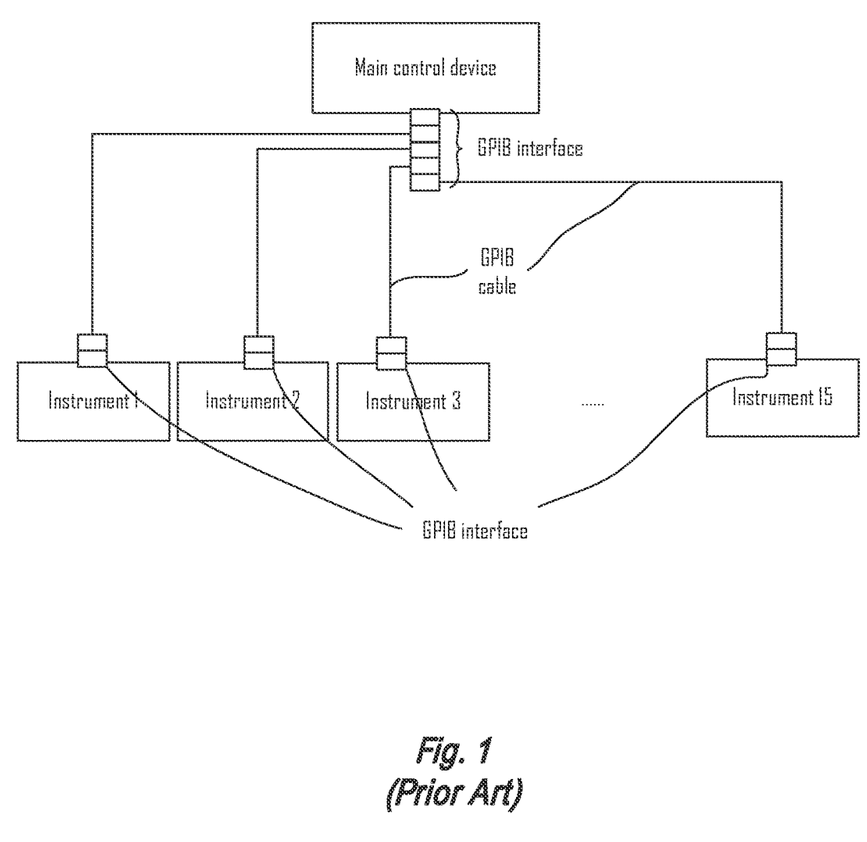
FIG. 1 is a simplified block diagram illustrating a GBIP-based test and measurement system of the prior art.

FIG. 1 is a simplified block diagram of a conventional GPIB-based testing system 100. System 100 includes a main control device (e.g., host computer) and test instruments (GPIB devices) 1 to 15 that are connected with the main control device through a GPIB interface and GPIB cable. Due to the heavy load on the GPIB interface, large interconnect parasitic capacitances, resistances, and inductances lead to the deterioration of data signal quality and error-prone transmissions. Therefore, the maximum distance for data transmission is limited to 20 m, and the maximum number of test instruments (test and measurement devices) on the same GPIB link (bus) is 15. Clearly, the limited physical interconnect distance and the number of instruments are the bottleneck of a GPIB-based testing system. Furthermore, since the GPIB interface is a wired connection, the mobility of test instruments (test and measurement devices) is relatively poor.

As the GPIB bus is mature and ubiquitous as the de-facto interconnection of programming and controlling test and measurement equipment, most testing devices have been equipped with the GPIB interface. Therefore, there is a need to overcome the limitation of the physical distance and the number of interconnected GPIB test and measurement devices.

BRIEF SUMMARY OF THE INVENTION

Embodiments of the present invention use the conventional GPIB interconnection and the ZigBee wireless technology to implement wireless interconnection without altering or changing existing equipment to overcome the range limit of the GPIB cable and the limited number of interconnected GPIB devices in measurement and testing systems.

In one embodiment, a conversion device includes a GPIB module configured to transmit and receive data in a GPIB format and a ZigBee module configured to transmit and receive data in a ZigBee format. The conversion device also includes a controller unit configured to convert data in the GPIB format into data in the ZigBee format and convert data in the ZigBee format into data in the GPIB format, and a configuration interface module configured to set up a ZigBee network and an operating mode of the conversion device.

In one embodiment, the GPIB module includes a GPIB interface configured to interface with a device equipped with a GPIB port and a GPIB controller unit configured to control data communication in the GPIB format. The GPIB module may also include a transmit buffer and a reception buffer.

In one embodiment, the configuration interface module includes a configuration interface unit configured to connect the conversion device to a computer and a configuration management unit configured to manage operations and configurations of the conversion device. The configuration interface unit comprises a USB port or a COM port.

In one embodiment, the ZigBee network includes a personal are network ID, a communication channel, and a network address.

In one embodiment, the conversion device may further include a static random access memory configured to store received data and converted data, a power supply unit configured to provide an operating voltage. In one embodiment, the power supply unit includes at least one of a battery, a USB port, and a charger interface.

In one embodiment, the conversion device also includes a power supply control module configured to control the power supply unit.

In another embodiment of the present invention, a network system includes a main control device equipped with a first GPIB interface, a first conversion device connected to the first GPIB interface of the main control device, a remote device equipped with a second GPIB interface, and a second conversion device connected to the second GPIB interface of the remote device. The first and second conversion devices have substantially the same structure.

In one embodiment, the first and second conversion devices each include a GPIB module configured to transmit and receive data in a GPIB format, a ZigBee module configured to transmit and receive data in a ZigBee format, a controller unit configured to convert data in the GPIB format into data in the ZigBee format and convert data of the ZigBee format into data of the GPIB format, and a configuration interface module configured to set up a ZigBee network and an operating mode of the conversion device.

In one embodiment, the first conversion device is configured to receive and identify GPIB format data coming from the main control device, convert the received and identified GPIB format data into data in the ZigBee format, and wirelessly transmit the data in the ZigBee format to the remote device. In one embodiment, the first conversion device is further configured to receive data in the ZigBee format transmitted by the remote device, convert the received data in the ZigBee format data into data in the GPIB format, and provide the data in the GPIB format to the main control device.

In one embodiment, the second conversion device is configured to wirelessly receive the data in the ZigBee format transmitted by the first conversion device, convert the received data in the ZigBee format into data in the GPIB format, and provide the GPIB format data to the remote device. The second conversion device may further be configured to receive and identify data in the GPIB format coming from the remote device, convert the received and identified GPIB format data into data into data in the ZigBee format, and wirelessly transmit the data in the ZigBee format to the main control device.

In one embodiment, the ZigBee network utilizes a transmission frame structure comprising a header field, a transmission frame type field, a single-wire interface information field, a GPIB data field, a system status information field, and a checksum field for transmission.

In one embodiment, the transmission frame type field may comprise bits for encoding one of the following frame types:

a downlink ZigBee system testing frame, an uplink ZigBee response system testing frame, a downlink GPIB controller message frame, an uplink GPIB response of device status frame, a downlink GPIB talker response message frame, an uplink GPIB talker message frame, a downlink reset all conversion devices frame, and an uplink response of conversion devices reset status frame.

In one embodiment, the network system may include multiple remote devices each equipped with a GPIB interface that is connected to a corresponding conversion device configured to communicate with the main controller device.

The following description, together with the accompanying drawings, will provide a better understanding of the nature and advantages of the claimed invention.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Embodiments of the present invention provide an interface conversion device that can convert a GPIB interface into a ZigBee interface and vice versa. The interface conversion device can wirelessly control and program existing test and measurement instruments without making any change to hardware and software of the existing instruments in a GPIB communication network while expanding the physical distance and the number of instruments in the communication network.

REFERENCES

ZigBee is a low-power wireless network personal area network (PAN) based on the IEEE 802.15.4 Standard. ZigBee has the characteristics of close proximity, low complexity, low latency, low power consumption, low cost, high security, etc. ZigBee is a two-way wireless communication in the unlicensed ISM bands and suitable for a wireless communication network of test and measurement systems.

The GPIB is the IEEE-488 interface bus. A large variety of measurement instruments from a large number of suppliers are available with a GPIB interface. The GPIB devices can be listeners, talkers and/or controllers. A talker sends data messages to one or more listeners. The controller manages the information flow on the GPIB by sending commands to all devices. Some devices may perform several functions, such as a digital voltmeter that acts as a talker by sending voltage information on the GPIB link (bus) and as a listener when receiving configuration and control information.

As used herein, the terms "module", "unit", "component", "interface" have the same meaning and may be exchanged with each other and interchangeably used.

Figure 2A:
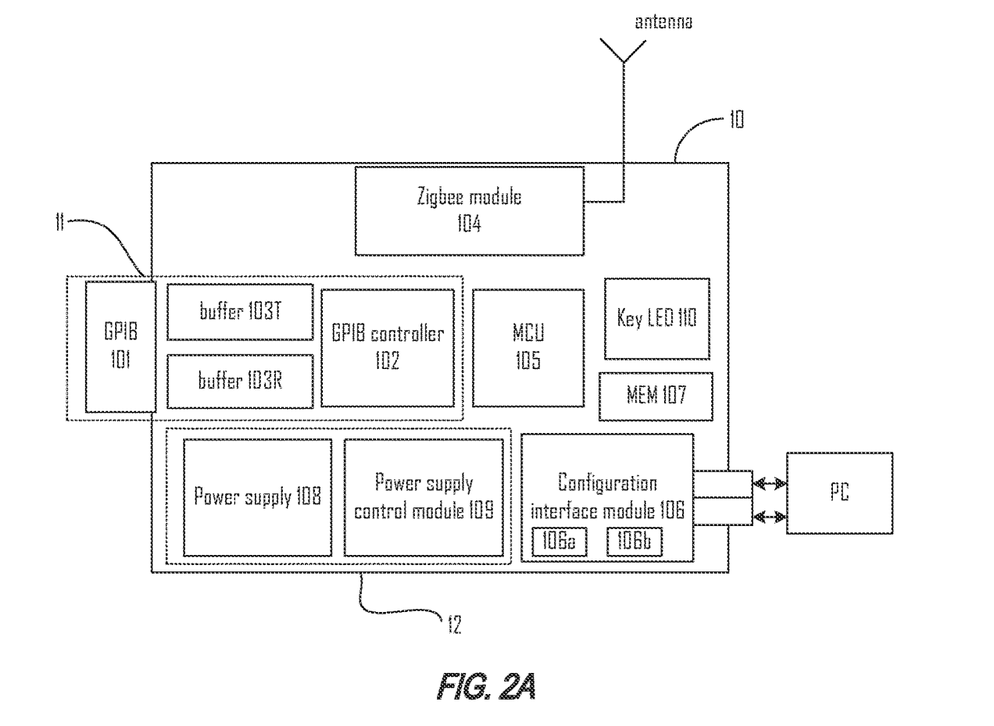
FIG. 2A is a simplified block diagram of an interface converter device according to an embodiment of the present invention.

FIG. 2A is a simplified block diagram of an interface conversion device 10 according to an embodiment of the present invention. Interface conversion device 10 is shown as including a GPIB interface 101, a GPIB control module 102, transmit buffer and receive buffer 103, a ZigBee module 104 connected to an antenna, a microcontroller unit (MCU) 105, and a configuration interface module 106. Interface conversion device 10 may also include a memory unit 107, a power supply unit 108, a power supply control module 109, and a key LED 110.

GPIB interface 101 is configured to connect to and communicate with GPIB-equipped devices (e.g., program and control of the connected instruments). GPIB control module 102 is configured to satisfy the GPIB data transmission protocol (i.e., the GPIB data format). Transmit buffer 103T is configured to temporarily store to be transmitted data. Receive buffer 103R is configured to temporarily store received data. GPIB interface 101, GPIB control module 102, and buffers 103 form a GPIB module 11, which is configured to transmit and receive data in the GPIB format.

ZigBee module 104 is configured to satisfy the ZigBee data transmission protocol (i.e., the ZigBee format).

MCU 105 is configured to convert the ZigBee data transmission protocol into the GPIB data transmission protocol and vice versa (i.e., convert the GPIB data transmission protocol into the ZigBee data transmission protocol). In other words, MCU 105 performs the conversion between the GPIB and ZigBee data transmission protocol. In addition, MCU 105 also performs other microcontroller operations, such as interrupt handling and others.

Configuration interface module 106 is coupled to a host computer (PC) and configured to receive ZigBee network information and an operating mode of the interface conversion device from the host computer. ZigBee network information may include an identification number of the personal area network (PAN), communication channels, device addresses, etc. Interface conversion device 10 generally includes two operating modes: (1) a mode for connecting to the main control device; and (2) a mode for connecting to test and measurement instruments. Configuration interface module 106 generally includes a configuration interface unit 106a and a configuration management module 106b. The configuration interface unit is configured to connect interface conversion module 10 to a computer (e.g., a PC). The configuration management module is configured to manage specific configuration operations. Examples of configuration interface units can be a USB port, a COM port, a serial peripheral interface (SPI) and the like.

Memory unit 107 is configured to store received data and the converted data. In an embodiment, Memory unit 107 can be a static random access memory (SRAM). Power supply unit 108 is configured to supply operating voltages to interface conversion module 10. Power supply unit 108 can be a battery, a USB powered interface, etc. Power supply control module 109 is configured to manage and control the power supply of interface conversion module 10. For example, power supply control module 109 can be a power management module. Power supply unit 108 and power supply control module 109 are collectively referred to as a power supply module 12. Key LED 110 is configured to provide illumination for the input keys (including mouse, keyboard, touch screen panel) and may serve as an indication of the operation status.

In accordance with the present invention, interface conversion device 10 can convert the ZigBee data format into the GPIB data format and the GPIB data format into the ZigBee data format, and wirelessly transmit and receive information data in a ZigBee network. Thus, wireless communications between existing instruments, such as between a host computer and test instruments without any hardware alteration or modification can be obtained by inserting interface conversion device 10 into the USB port of the host computer and the test instruments in the communication network.

In practical applications, interface conversion device 10 can be mounted directly onto the existing GBIP port of the main control device to implement wireless communications between the main control device and test devices equipped with ZigBee wireless modules. Interface conversion device 10, prior to performing wireless interface operations, requires to be configured by a computer through a conventional interface port such as the COM port, the SPI port, or the USB port.

Figure 2B:
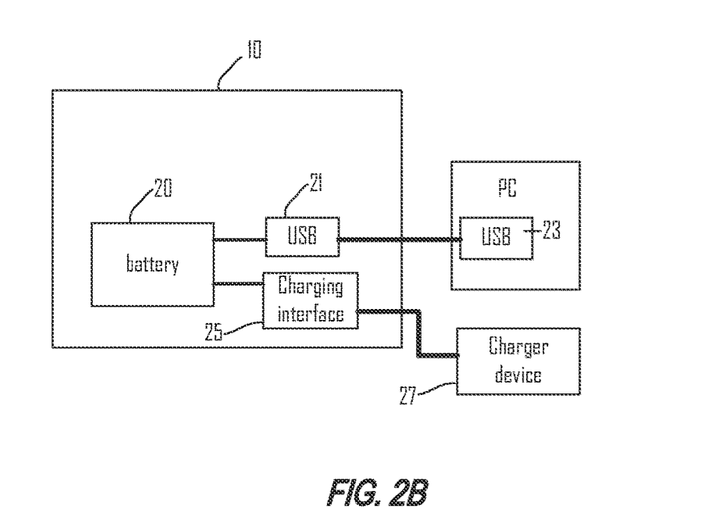
FIG. 2B is a block diagram of a configuration of an interface conversion device according to an embodiment of the present invention.

FIG. 2B is a block diagram of a configuration of an interface conversion device according to an embodiment of the present invention. As shown in FIG. 2B, power supply unit 108 of interface conversion device 10 includes a battery 20 coupled to a USB interface 21, which, in turn, is connects to a USB interface 23 of a host computer (e.g., PC). USB interface 21 serves as a two-way data communication with the host computer and receives power from the host computer. Interface conversion device 10 may further include a charging interface 25 configured to receive power from an external charger device 27.

Figure 3:
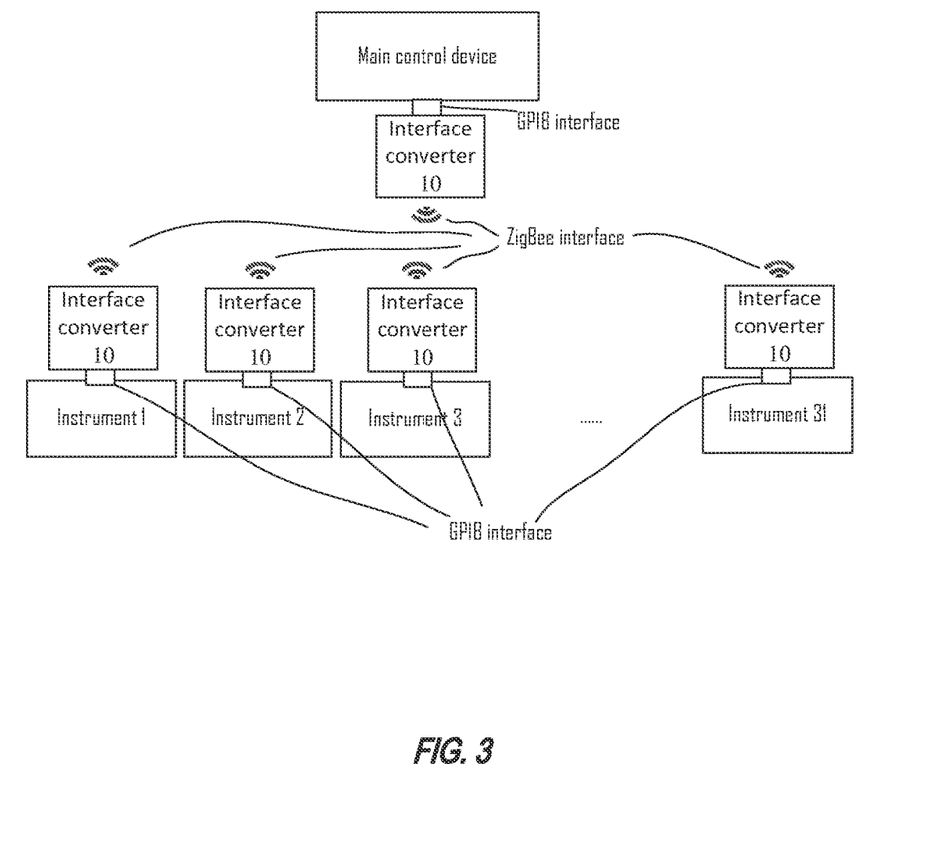
FIG. 3 is simplified block diagram illustrating a wireless communication network system according to an embodiment of the present invention.

Embodiments of the present invention provide a network system including a main control device (e.g., a host computer) and an interface conversion device 10 connected to the main control device via a GPIB connection, as shown in FIG. 3. The main control device is used to perform management and control of equipment in a network (e.g., instruments in a laboratory). The GPIB interface of the main control device is connected to interface conversion device 10 for forming a ZigBee wireless communication network. According to embodiments of the present invention, the ZigBee wireless communication network (alternatively referred to as ZigBee network) includes a main control device and a number of testing devices (also referred to as test instruments, instruments, test equipment, measurement devices) in the range between 1 and 31.

Interface conversion device 10 connected to the main control device may be configured to perform the following operations: (1) receive and identify data coming from the main control device in the GPIB format (e.g., command), convert the data in the GPIB format into data in the ZigBee format, and wirelessly send the data in the ZigBee format to test equipment (test and measurement devices) located in the ZigBee network. Each test and measurement device is also equipped with a similar or identical interface conversion device 10, where the test and measurement device is a listener and the main control device is the talker; (2) receive data in the ZigBee format sent by the test equipment in the ZigBee network and convert the received data in the ZigBee format into data in the GPIB format and provide the converted data in the GPIB format to the main control device, which is now the listener.

The interface conversion device connected to a test instrument is configured to perform the following operations: (1) receive data sent by the main control device in the ZigBee format, convert the received data in the ZigBee format into data in the GPIB format, and provide the converted GPIB format data to the GPIB port of the test instrument. The test instrument is in this case the listener; (2) receive data in the GPIB format of the test instrument (e.g., test and measurement results), convert the GPIB format data into data in the ZigBee format, and send the ZigBee format data to the main control device (through the interface conversion device connected to the main control device). The sending test instrument is the talker in this case.

A two-way wireless communication can be obtained through the above described configuration. A GPIB address is assigned to the interface conversion device of the main controller and to the interface conversion device of each of the test and measurement device in the ZigBee network. As described above, the interface conversion device 10 can be configured by a personal computer (host computer) through the configuration interface module 106 (e.g., USB port, COM port, SPI port and the like). During the configuration process, the computer may supply power to the interface conversion device and/or charge battery 20 of interface conversion device 10.

In the above-described ZigBee wireless communication network system, the interface conversion device connected to the main control device is the coordinator device, and the interface conversion devices connected to the test and measurement devices are the end devices. In the context of the present invention, the term "network" or "network system" refer to a logical network of one or more devices, which communicate with each other using unique network addresses. The devices in the network are programmed with network configuration data that may include a personal area network identifier (PAN ID), a channel number (communication channel), and a network address.

In embodiments of the present invention, the interface conversion device may be powered by a power supply from the built-in power supply unit (e.g., battery) that can be charged by a charger, or powered and charged through a USB port of the main control device.

In an embodiment, interface conversion device 10 connected to the host computer may receive and identify GPIB commands sent from the host computer through GPIB interface module 101. GPIB controller 102 converts the received and identified GPIB commands into data in the ZigBee format and provides to ZigBee module 104, which sends the ZigBee format data via the antenna. On the other hand, interface conversion devices 10 connected to test instruments receive the ZigBee format data and convert the received ZigBee format data into data in the GPIB format and provide to the test instruments through the GPIB modules 101. If the test instruments are the talkers, data of the test instruments can also be sent in the reverse direction back to the host computer or to other listeners. Meanwhile, the interface conversion device in the ZigBee network has the GPIB address of each test instruments. The interface conversion device also needs to be configured with ZigBee network information, such the PAN identifier, the communication channel, and the ZigBee address. Referring to FIG. 3, the ZigBee module connected to the host computer is configured as coordinator, and the ZigBee modules of the interface conversion devices of the test instruments are configured as end devices.

Because the ZigBee wireless network is used for communication between the main control device and the test and measurement devices, the mobility of the test and measurement system has improved. Furthermore, since the ZigBee network supports a communication range more than 50 meters (and less than 75 meters) and has a star configuration supporting up to 31 test and measurement devices, as shown in FIG. 3, this configuration not only increases the physical distance, but also exceeds the number of devices in the GPIB-based system.

According to the present invention, the interface conversion device provides a wireless communication network system (ZigBee wireless communication network) to the original test system (see FIG. 1), which has a maximum of 15 test and measurement devices and a limited range and mobility, the thus formed wireless network system not only provides better mobility to the test and measurement devices, but also increases the number and range of the test and measurement devices in the wireless network. Furthermore, no hardware modifications to the original test system are required. In other words, the new network system may include the original GPIB-based cable network and the new ZigBee wireless network, no changes to the test and measurement devices are required, and new test and measurement can be added without new GPIB cables, thereby savings system costs. Thus, the interface conversion device can be used to upgrade an existing GPIB-based test system to increase the range, mobility and the number of test and measurement devices of the current GPIB-based test system.

It is appreciated that embodiments of the present invention are not limited to test and measurement systems, the embodiments also can be utilized in other GPIB-based control systems without compromising the existing hardware and software setup.

In some embodiments, messages in the GPIB format may include interface messages and device messages. Depending on the number of control lines used to send messages, the messages may be single-wire interface messages and multi-wire interface messages. The interface messages may include communication (transmission) message, command message, search address message, auxiliary message. The device messages may include programming instructions, measurement data, and other status bytes, etc.

Figure 4:
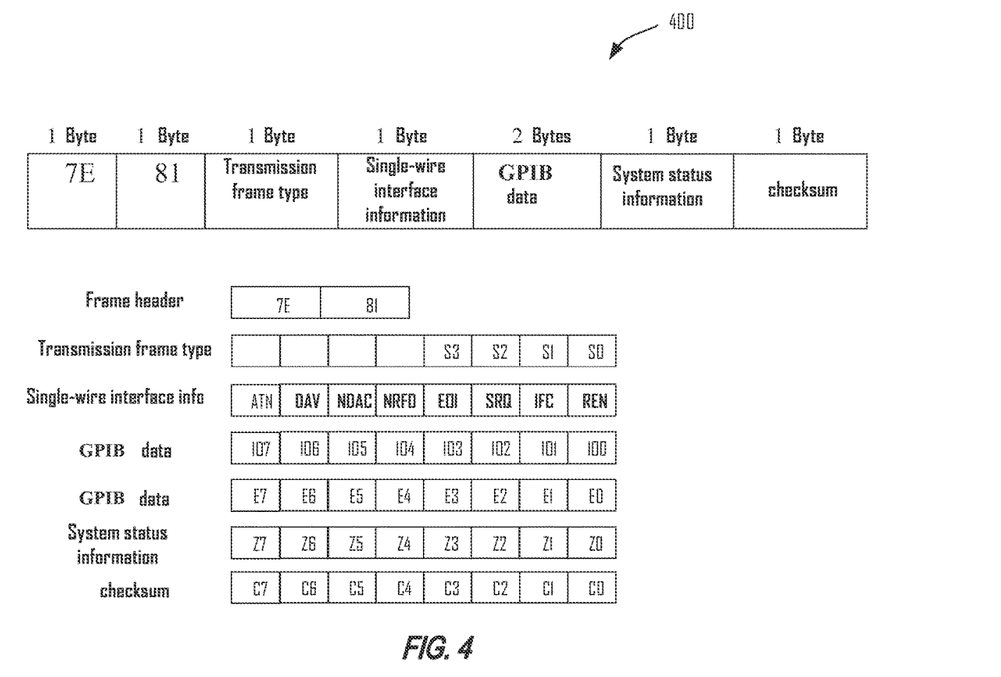
FIG. 4 is a transmission frame structure according to an embodiment of the present invention.

In order to convert data between the GPIB and ZigBee formats, embodiments of the present invention define a transmission frame structure. FIG. 4 shows an exemplary transmission frame structure 400 according to an embodiment of the present invention. Transmission frame structure 400 may include a frame header (2 bytes), a transmission frame type (1 byte), a single-wire interface information field (1 byte), GPIB data (2 bytes), a system status information field (1 byte), and a checksum field (1 byte). In an embodiment, the frame header is "7E/81" and is used to indicate the start of the transmission frame sent from the main control device to the test and measurement devices as well as for the transmission frame from the test and measurement devices to the main control device. The single-wire interface information field is 1 byte and contains the standard GPIB signals. The GPIB data field is 2 bytes for the transmission of GPIB data. The single-wire information field and the GPIB data field are necessary for the GPIB information and data transmission. The system status information field is 1 byte and contains the status of the communication network system including the GPIB and the ZigBee network.

Figure 5:
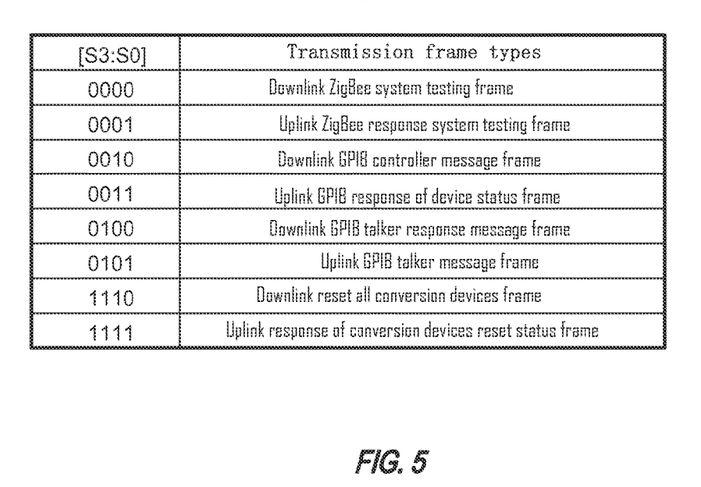
FIG. 5 is a transmission frame type indication field indicating different transmission frame types according to an embodiment of the present invention.

In an embodiment, the transmission frame type field includes 4 bits (S3, S2, S1, S0). FIG. 5 is an exemplary transmission frame type indication field indicating different transmission frame types according to an embodiment of the present invention. The transmission frame types are shown as including a "downlink ZigBee system testing frame" ([S3:S0]="0000"), an "uplink ZigBee response system testing frame" ([S3:S0]="0001"), a "downlink GPIB controller message frame" ([S3:S0]="0010"), an "uplink GPIB response to control status frame" ([S3:S0]="0011"), a "downlink GPIB talker response message frame" ([S3:S0]="0100"), an "uplink talker GPIB message frame" ([S3:S0]="0101"), a "downlink reset all test devices frame" ([S3:S0]="1110"), and an "upstream response of the reset status frame" ([S3:S0]="1111"). Other remaining [S3:S0] may be reserved for future use. The term "uplink" is referred to as the direction from the device(s) to the main control device (host computer). The term "downlink" is referred to as the direction opposite of the uplink direction, i.e., from the main control device to the interface conversion devices of test instruments (downstream devices).

The "single-wire interface information" field and the "GPIB data" field are necessary for the GPIB communication. The "system status information" field is used to indicate the status of the ZigBee and GPIB communications in the complete network system. The "checksum" field is used to determine the valid status of the frame structure 400.

According to the present invention, the interface conversion device 10 can convert data in the GPIB format to data in the ZigBee format and vice versa. The interface conversion device 10 can wirelessly transmit and receive data in the ZigBee format. The interface conversion device 10 may expand the range and the number of connected devices in an existing GPIB test system without making hardware modifications to the existing system. By adding the ZigBee system to an existing GPIB system, the range and the number of connected devices are extended and the mobility of the connected devices is improved.

Figure 6:
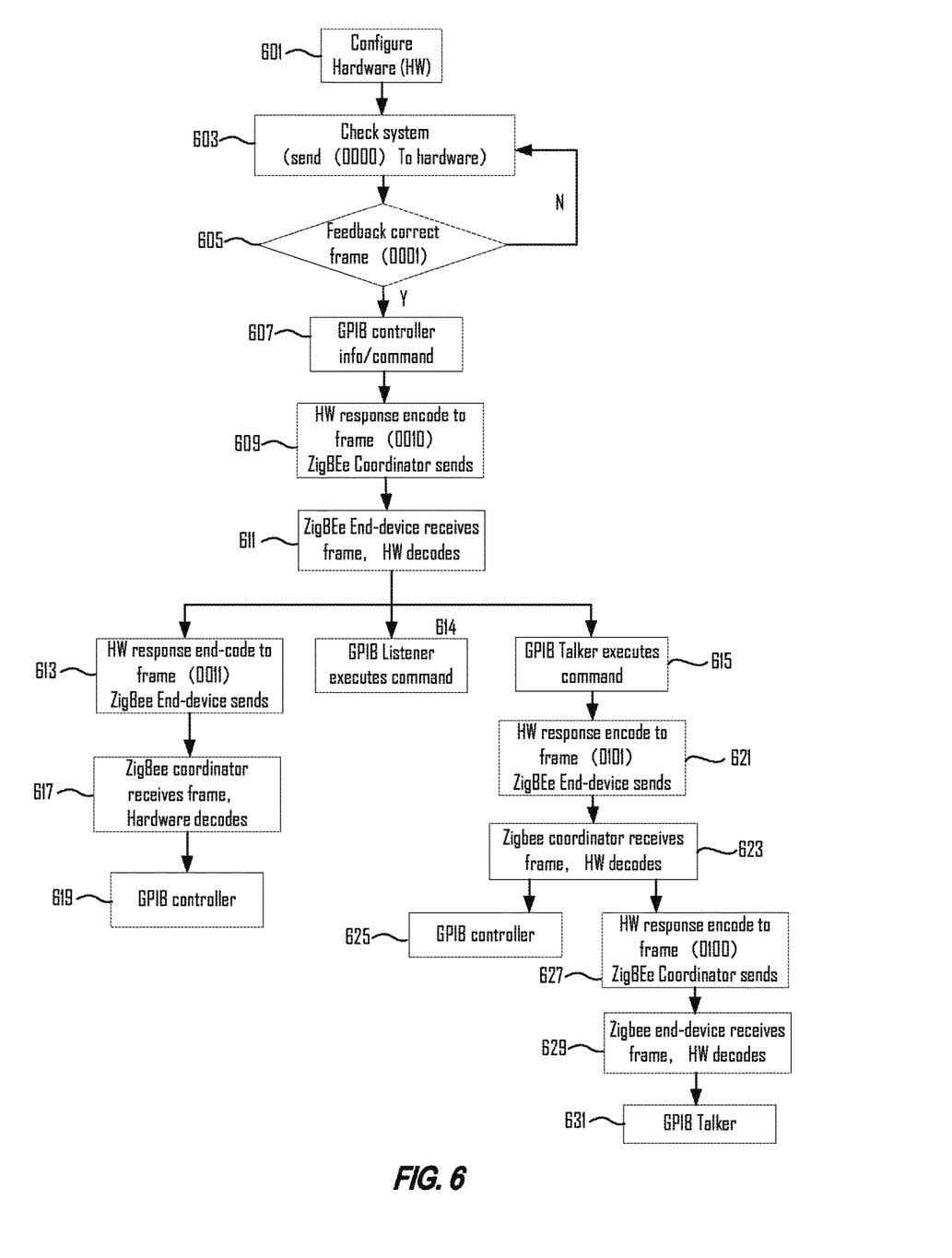
FIG. 6 is a flowchart illustrating the operation of the wireless communication network system according to an embodiment of the present invention.

FIG. 6 is a flowchart illustrating operations of the interconnect network system according to an exemplary embodiment of the present invention. At 601, the interface conversion device is configured by a host computer through the configuration interface module. For example, the interface conversion device is programmed by the host computer with network configuration data including the PAN ID, a communication channel, (channel number), a network address. An encryption key may also be provided and stored in an appropriate area of a memory. The ZigBee module is configured as a coordinator, and an appropriate channel is selected for the wireless communication network to operate on. In an exemplary embodiment, the coordinator broadcasts a beacon request, and all nearby coordinators that have already joined the ZigBee network will respond to the beacon request by sending a beacon back to the coordinator. In an embodiment, all ZigBee devices may be preconfigured with a PAN ID so that they belong to the ZigBee network. The coordinator may send (broadcast) queries to remote devices within the network to cause the remote devices to generate a response. As shown in FIG. 6, the coordinator may send a downlink system check frame ([S3:S0]="0000") to remote devices (e.g., test instruments) at 603, which respond with an uplink ZigBee response system testing frame (([S3:S0]="0001") at 605. The interface conversion device determines whether or not the response message is a correct response message. In the event that the response message is not a correct response message, the interface conversion device will send a new downlink ZigBee system testing frame ("0000"). In the event that the response is a correct response, then the host computer sends a GPIB information/command to the GBIP module, which the GPIB controller module converts to the ZigBee format for transmission at 609. The interface conversion device of the remote devices (i.e., end devices) receives and decodes the ZigBee format data, and converts the decoded ZigBee format data into the GPIB format data at 611. There are the following scenarios. In one case, the end device may send back an uplink GPIB response reporting the end-device status (frame type "0011") at 613. The ZigBee coordinator receives and encodes the frame, and the GPIB controller converts the ZigBee format data into the GPIB format data at 619. In the second case, the end device is a listener and executes the GPIB command at 614. In the third case, the end device is a talker and executes the GPIB command at 615, send an uplink message frame (frame type "0101") through its interface conversion device at 621. The interface conversion device of the host computer receives and decodes the ZigBee format data at 623, converts the ZigBee format data into the GPIB format data and provides to the GPIB controller at 625. Alternatively, the interface conversion device sends back a downlink GPIB talker response message (frame type "01"") at 627. The end device receives and decodes the frame at 629, converts the decoded ZigBee format data into the GPIB format data and provides to the GPIB talker at 631.

According to embodiments of the present invention, the interface conversion device can be implement in hardware, software, or a combination thereof. The interface conversion device can also be an application specific integrated circuit (ASIC), a field-programmable gate array (FPGA), or a printed circuit board containing discrete components such as a power supply, a GPIB module, a ZigBee module, a memory module, a GPIB controller, a microcontroller unit, a configuration interface module (comprising a SPI port, a USB port, and/or a COM port), a power supply control module (power management IC).

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of GPIB controller programming and ZigBee transmission protocols are omitted. Various modifications of the illustrative embodiments as well as other embodiments will be apparent to those of skill in the art upon reference to the description. For example, although four bits for encoding the transmission frame types are used, it is understood that the number can be more or fewer than four in other embodiments. Similarly, although 8 bits for checksum are used, it is understood that the checksum can use more or fewer than 8 bits. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof.

What is claimed is:

1. A conversion device for increasing a location and mobility of devices connected in a bus-based network, comprising:
    a GPIB module configured to transmit and receive data in a GPIB format;
    a ZigBee module configured to transmit and receive data in a ZigBee format;
    a controller unit configured to convert data in the GPIB format into data in the ZigBee format and convert data in the ZigBee format into data in the GPIB format; and
    a configuration interface module for coupling to a host computer and configured to receive ZigBee network information and an operating mode of the conversion device from the host computer,
    wherein the controller unit converts the data between the GPIB and ZigBee formats using a frame comprising a header field, a transmission frame type field, a single-wire interface information field, a GPIB data field, a system status information field, and a checksum field.

2. The conversion device of claim 1, wherein the GPIB module comprises:
    a GPIB interface configured to interface with a device equipped with a GPIB port; and
    a GPIB controller unit configured to control the device as a talker or a listener.

3. The conversion device of claim 2, wherein the GPIB module further comprises:
    a transmit buffer and a reception buffer.

4. The conversion device of claim 1, wherein the configuration interface module comprises:
    a configuration interface unit configured to connect the conversion device to the host computer; and
    a configuration management unit configured to manage operations and configurations of the conversion device.

5. The conversion device of claim 4, wherein the configuration interface unit comprises a USB port or a COM port.

6. The conversion device of claim 1, wherein the ZigBee network information comprises a personal area network ID, a communication channel, and a network address.

7. The conversion device of claim 1, further comprising:
    a static random access memory configured to store received data and converted data.

8. The conversion device of claim 1, further comprising:
    a power supply unit configured to provide an operating voltage.

9. The conversion device of claim 8, wherein the power supply unit comprises at least one of a battery, a USB port, and a charger interface.

10. The conversion device of claim 8, further comprising:
    a power supply control module configured to control the power supply unit.

11. A network system for increasing a location and mobility of devices originally connected in a bus-based network, comprising:
    a main control device equipped with a first GPIB interface;
    a first conversion device connected to the first GPIB interface of the main control device;
    a remote device equipped with a second GPIB interface;
    a second conversion device connected to the second GPIB interface of the remote device, the second conversion device having substantially a same structure as the first conversion device; wherein:
    each of the first and second conversion devices comprises:
        a GPIB module configured to transmit and receive data in a GPIB format;
        a ZigBee module configured to transmit and receive data in a ZigBee format;

a controller unit configured to convert data in the GPIB format into data in the ZigBee format and convert data of the ZigBee format into data of the GPIB format; and a configuration interface module, wherein the configuration interface module of the first conversion device is coupled to a host computer for receiving ZigBee network information and an operating mode of the first conversion device, and wherein the first conversion device is a coordinator device and the second conversion device is an end device.

12. The network system of claim 11, wherein the first conversion device is configured to:

receive and identify GPIB format data coming from the main control device;

convert the received and identified GPIB format data into data in the ZigBee format;

wirelessly transmit the data in the ZigBee format to the remote device.

13. The network system of claim 12, wherein the second conversion device is configured to:

wirelessly receive the data in the ZigBee format transmitted by the first conversion device;

convert the received data in the ZigBee format into data in the GPIB format; and provide the GPIB format data to the remote device.

14. The network system of claim 12, wherein the first conversion device is further configured to:

receive data in the ZigBee format transmitted by the remote device;

convert the received data in the ZigBee format data into data in the GPIB format; and provide the data in the GPIB format to the main control device.

15. The network system of claim 13, wherein the second conversion device is further configured to:

receive and identify data in the GPIB format coming from the remote device;

convert the received and identified GPIB format data into data into data in the ZigBee format;

wirelessly transmit the data in the ZigBee format to the main control device.

16. The network system of claim 11, wherein the first and second conversion devices communicate using a transmission frame comprising a header field, a transmission frame type field, a single-wire interface information field, a GPIB data field, a system status information field, and a checksum field.

17. The network system of claim 16, wherein the transmission frame type field comprises bits for encoding one of the following frame types:

a downlink ZigBee system testing frame;

an uplink ZigBee response system testing frame;

a downlink GPIB controller message frame;

an uplink GPIB response of device status frame;

a downlink GPIB talker response message frame;

an uplink GPIB talker message frame;

a downlink reset all conversion devices frame; and an uplink response of conversion devices reset status frame.

18. The network system of claim 11, further comprising additional remote devices each equipped with a GPIB interface connected to a corresponding conversion device configured to wirelessly communicate with the main controller device through the ZigBee module.

* * * * *